United States Patent

Shuch

Patent Number: 4,713,669
Date of Patent: Dec. 15, 1987

[54] BINAURAL DOPPLER COLLISION ALERT SYSTEM FOR GENERAL AVIATION AIRCRAFT

[76] Inventor: Howard P. Shuch, 14908 Sand La., San Jose, Calif. 95124

[21] Appl. No.: 888,759

[22] Filed: Jul. 23, 1986

[51] Int. Cl.⁴ ............................................. G01S 3/02
[52] U.S. Cl. ...................................... 342/455; 342/29
[58] Field of Search ....................... 342/23, 24, 27–29, 342/33–35, 41, 455, 147, 192–193; 367/116

[56] References Cited

U.S. PATENT DOCUMENTS

| Re. 32,252 | 9/1986 | Kay | 367/116 X |
| 3,134,100 | 5/1964 | Lakatos | 342/29 |
| 3,887,896 | 6/1975 | Ramstedt | 367/116 |
| 3,940,769 | 2/1976 | Sherman et al. | 342/192 X |
| 3,987,403 | 10/1976 | Smith | 342/24 X |
| 4,292,678 | 9/1981 | Kay | 342/24 X |
| 4,310,903 | 1/1982 | Kay | 367/116 X |

FOREIGN PATENT DOCUMENTS 0860992  3/1955  Fed. Rep. of Germany ...... 367/116

OTHER PUBLICATIONS

Smith et al., "A Fishfinding Sonar Utilizing an Audio Information Display"; Digest of Technical Papers of the 1970 IEEE Conference on Engineering in the Ocean Environment; pp. 113-115; (Sep. 21-24, 1970.)

Primary Examiner—Theodore M. Blum
Assistant Examiner—Bernarr Earl Gregory
Attorney, Agent, or Firm—Norman L. Chalfin

[57] ABSTRACT

An aircraft collision avoidance system is disclosed which presents target or threat information to a pilot using a pair of doppler radar transceiver systems directed orthogonally about and centered on the user aircraft's pitch plane to produce binaural audio tones that by their amplitude, frequency and phase difference allow the user pilot to visualize the location and closing rate of a potential target or threat, aurally, while maintaining an effective visual traffic scan.

6 Claims, 3 Drawing Figures

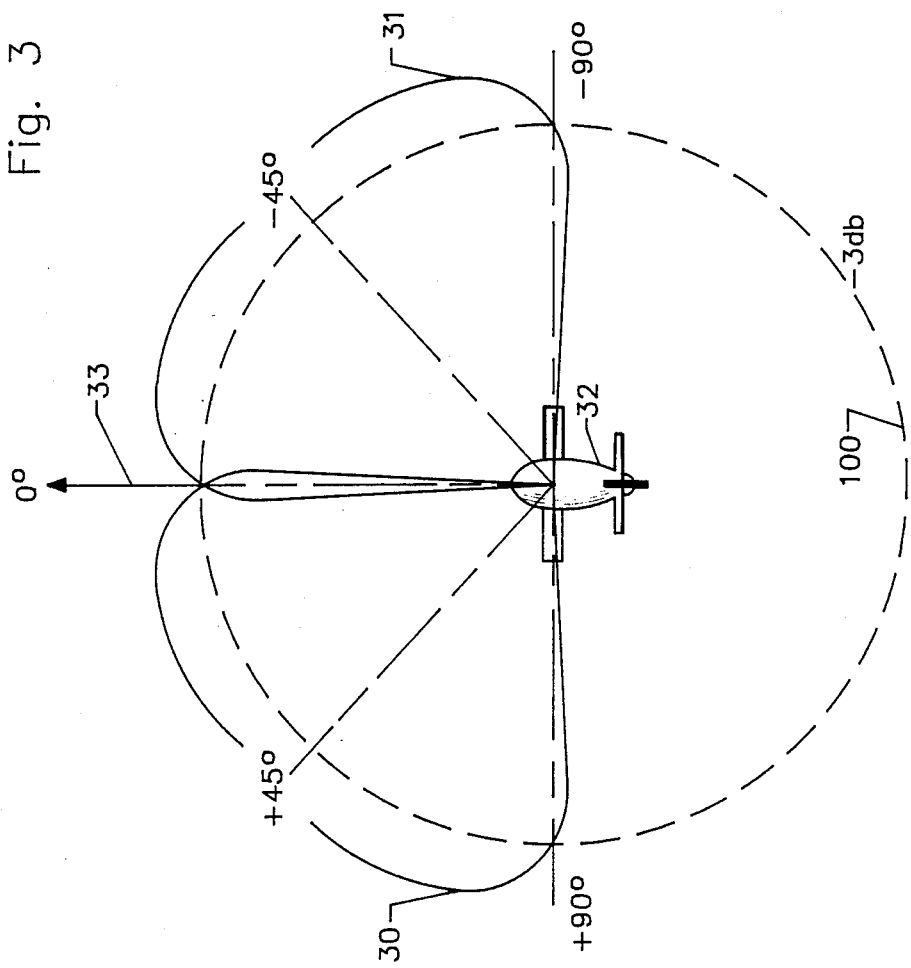

BINAURAL DOPPLER COLLISION ALERT SYSTEM FOR GENERAL AVIATION AIRCRAFT

BACKGROUND OF THE INVENTION

In the field of general civil aviation only 2% of the planes in the air are air carriers. There are some 225,000 small aircraft in the skies. While there are vast areas in which these aircraft can travel, some thirty times a year two such craft find themselves in the same airspace at the same time. In at least half of the resulting crashes there are fatalities.

Efficient systems have been developed to track the aircraft in any locality through the ground based Air Traffic Control System (ATCS). In the future more advanced computers and automation may be developed with verbal computer-generated commands to pilots. Advanced technology notwithstanding, the ultimate responsibility for collision avoidance lies with the aircraft pilots, not with the Air Traffic Controllers. Means are required to provide a pilot with an indication of the location of a nearby aircraft which does not distract the pilot's view of the airspace ahead and within his angle of view. Most prior art systems for collision avoidance provide a radar display of some character. This requires a pilot to observe a cathode ray or other display, typically disposed on the pilot's instrument panel that may distract the pilot from the field of view about the aircraft.

THE PRIOR ART

Current technology provides civil aviation with a wide variety of effective methods for determining those variables pertinent to the collision avoidance equation: target distance, bearing, direction of flight and relative velocity. Existing systems provide this information to the pilot visually. Bennett, et al, U.S. Pat. No. 3,714,648 describes a system in which a visual display "indicates the quadrant and altitude of the responding aircraft." Morse, U.S. Pat. No. 3,611,371 discloses a radar system using a spherically shaped or planar display. T. Anderson, U.S. Pat. No. 3,750,164 shows a TV receiver used as a radar display. R.Anderson, et al, U.S. Pat. No. 3,790,938, depict an aircraft panel mounted display instrument. Brandao and Taylor use a digital memory to refresh a cathode ray tube. Casse, et al, U.S. Pat. No. 4,017,853 describe a panel including a plurality of juxtaposed light indicators. Evans, U.S. Pat. No. 3,789,397 describes a means for displaying the position of a remotely observed body in three dimensional space, a system employing a three-dimensional display and at least two trainable laser beam assemblies.

The primary objection to these visual display systems is that they keep the eyes of the crew in the cockpit instead of encouraging a constant and thorough visual traffic scan. Verbal information to a pilot can lead to a misinterpretation: for example, an aircrew member could respond to a call "traffic at your 1 o'clock position three miles" by looking at 3 o'clock and 1 mile.

In any collision avoidance system, whether based on skin reflective radar, transponders, lasers, airborne interrogators, ground-based support or satellites, the weak link has to do with clear, unambiguous communication of traffic information to the pilot in a manner compatible with both the performance of required flight duties and maintaining an effective visual traffic scan.

THE PRESENT INVENTION

This invention contemplates a system in which binaural hearing can enable communication to a pilot the position, relative distance and closing velocity of potentially conflicting traffic without distracting the pilot from either normal cockpit duties or a visual traffic scan.

Binaural hearing has been defined in Campbell, R. L., "Binaural Reception of SSB and CW Signals Received on a Pair of Antennas"—*Proceedings of the 18th Conference of the Central States UHF Society*, Cedar Rapids, Iowa, pp 27–33, July 1984.—as the use of relative amplitude, phase, and time delay information between a listener's two ears to determine the position of a sound source and permit the listener to concentrate on that direction. Tremaine's "Audio Cyclopedia", p. 82 (Howard W. Sams & Co., Inc., publisher, 2nd Edition, 1973) indicates that the binaural effect can only be had when the listener is wearing earphones.

In Campbell's tests of binaural audio as an enhancement to communications, he finds "the resulting binaural audio output" exhibits the same qualities as a stereo audio recording, with a perceived space and each signal at a different location. The ability to concentrate on a weak signal below the noise level is greatly enhanced. Sommer,R. C. "A Simple Effective Receiving Aid", *QST* Vol. 20, No. 2, Feb. 1986, employed binaural audio in communications experiments, reporting that "your consciouness is provided a directionl parameter which enhances the ability to focus attention upon and, hence to better comprehend any one of the signals."

The binaural doppler collision alert system of this invention has for an object to provide the pilot of an aircraft an aural indication of the presence of potentially conflicting air traffic. The distance to the nearby aircraft, its location with respect to the user aircraft and its motion and direction of motion relative to the user aircraft are all conveyed to the pilot directly to the ear/brain combination through the binaural hearing of the pilot.

The system contemplated herein envisions that a binaural headset will enable the pilot to hear the direction and location of the traffic. The distance information is conveyed by the amplitude of the signal. The frequency or pitch of the audio signal, as it changes, conveys the closing rate, or rate of approach and relative velocity of the threat aircraft to the user's aircraft.

The binaural headset being used by the pilot can be so arranged that it is part of the general communications facility of the aircraft providing intercommunication with other members of the crew as well as communication with radio ground control facilities as needed.

There is a general need by pilots for an efficient collision avoidance system that must be self-contained and non-cooperative with, or dependent upon a ground control system, or on components of another aircraft. The collision avoidance system defined herein employs two reflective doppler radar transceivers, each of which has a 90° azimuth antenna beamwidth, aimed on either side of the longitudinal axis of the user aircraft at an angle of 45° with respect to the aircraft direction and plane of flight. This provides a half circle of coverage from the aircraft's 9 o'clock to its 3 o'clock position. It will have its greatest sensitivity to reflections from targets or threats in or near the pitch plane of the aircraft in which it is installed. That is, near the user's altitude.

The system can be expanded so as to provide full 360° azimuth coverage with the use of four orthogonally aimed doppler radar transceivers driving a quadriphonic (4 channel) headset. For convenience and practicality the two channel system with 180° coverage is being defined herein.

Accordingly, a preferred embodiment of the invention is described hereinbelow in the specification which follows and in the accompanying drawings. The illustrations and descriptions should not be construed as limiting the invention to the specific embodiment shown and described since others may conceive variations which would be embodied within the ambit of the claims which follow the specification and the descriptions of the figures.

BRIEF DESCRIPTIONS OF THE FIGURES

FIG. 3 is a schematic diagram of the preferred radiation patterns of the dual reflective doppler radar transceivers employed in the embodiment of the invention illustrated in FIG. 1.

DETAILED DESCRIPTIONS OF THE FIGURES

As has been discussed hereinabove the invention herein lies in a binaural doppler radar collision alert system for aircraft pilots. The system provides a binaural audio signal, derived from a pair of doppler radar transceivers disposed in the pilot's aircraft, applied to a stereo or binaural headset. From these binaural audio signals the pilot can locate aurally another aircraft in the vicinity of his (the user's) aircraft posing a threat of possible collision with the aircraft in which the system of this invention is installed. The phase, frequency or pitch, and amplitude of the binaural signals provide to the pilot location information, direction of flight and closing rate of the approaching threat craft.

Figure 1:
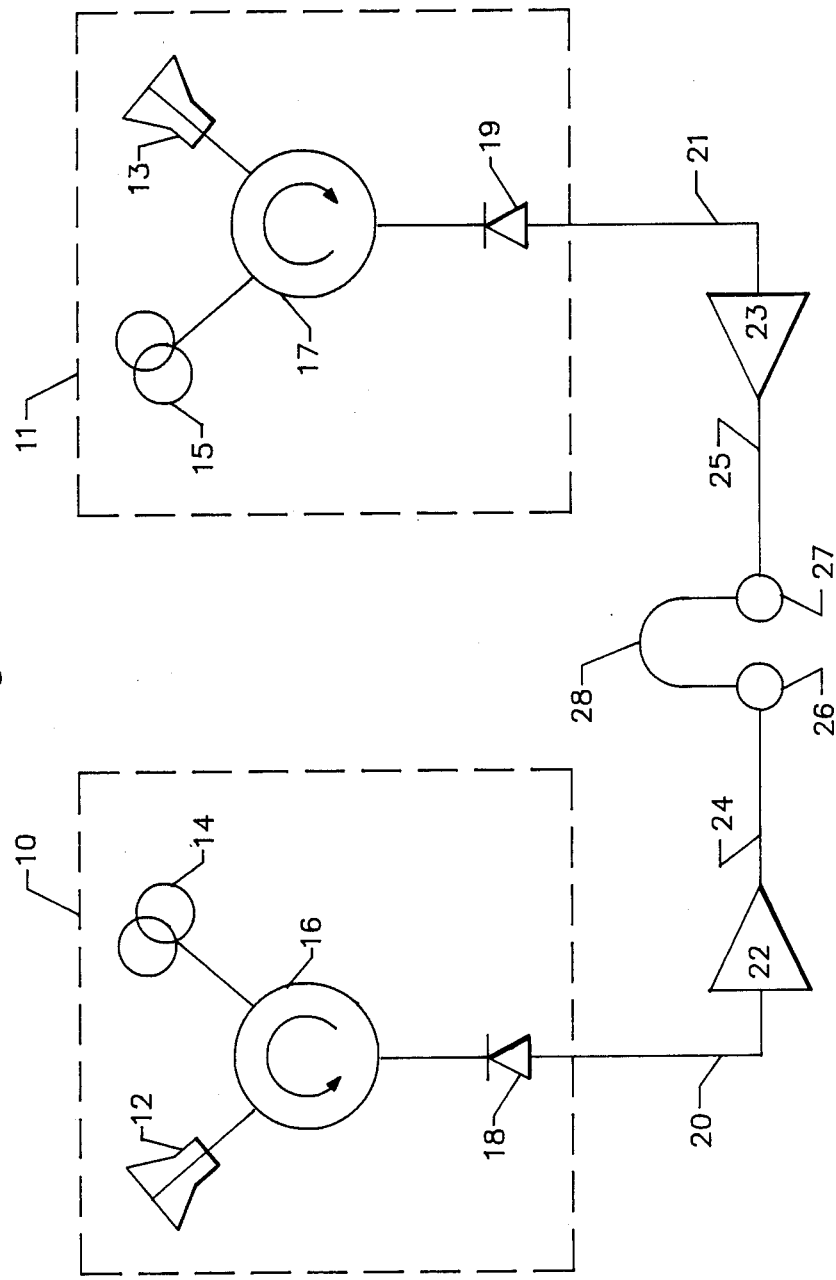
FIG. 1 is a simplified partially block and partially schematic diagram of the reflective dual doppler radar transceiver system of this invention which provides to the user aircraft pilot's audio headset, the binaural audio signals which are indicative of the location, range, closing rate and direction of a target or threat craft in the user aircraft's vicinity.

FIG. 1, a schematic block diagram, illustrates the basic system for the dual reflective doppler radars used in the operation of the invention. With reference to FIG. 1 a pair of doppler radar transceivers are shown schematically within respective dashed blocks 10 and 11. The tranceivers within each block 10 and 11, respectively, each incorporate a horn waveguide microwave antenna such as 12 and 13, a microwave source such as 14 and 15, a duplexer such as 16 and 17, and a mixer diode or detector such as 18 and 19. The circuits in blocks 10 and 11 operate identically in the known manner of a reflective doppler radar transceiver wherein the microwave source 14 or 15 is a continuous wave oscillator at a microwave frequency for generation of a signal to be transmitted as a beam in a specific direction via its associated microwave horn 12 or 13 and reception of reflections through the horn of that signal from a target object through the associated duplexer 16 or 17 and respective mixer diode 18 or 19 to produce an audio signal on respective output lines 20 or 21 resulting from the relative motion between the user aircraft and a target aircraft within the transmitted beam.

The audio signals on lines 20 or 21 are applied to respective amplifiers 22 and 23. The amplified signals on lines 24 and 25 are applied to respective left and right earphones 26 and 27 of an audio (stereo) headset 28 worn by the pilot. The headset 28 may be a standard headset wired so as to utilize not only the signals from the respective doppler radars used in this invention but also to listen to the communications and other audio signals an aircraft pilot must monitor in flight. A mixing circuit for the various aircraft audio sources including those of this invention is further detailed in FIG. 2 and further described below.

As illustrated in FIG. 3 the microwave beam patterns 30 and 31 of the reflective doppler radars cover respective left and right quadrants ahead of the aircraft 32. Each beam direction is angled at 45° with respect to the longitudinal axis of the aircraft (arrow 33 pointing at 0°). The overall coverage is +90° to −90°, or the half circle from 9 o'clock to 3 o'clock in the pilot's view pattern.

It should be clear from the above that an installation of four doppler radar systems on the user aircraft may be employed. The additional two radars are are electrically identical wit radars 10 and 11, and directed behind the aircraft, one at an angle of 45° to the left rear and the other 45° to the right rear of the user aircraft, respectively. The resulting four quadrant beams would provide 360° coverage (100) of the airspace in the flight plane of the aircraft. Implementation of the full four quadrant coverage would require a quadriphonic (four channel) audio system feeding the pilot's earphones 28 and give him, aurally, directional, rate of closing, and other location information about the potentially conflicting aircraft not only ahead of the user aircraft but also behind the user aircraft.

Figure 2:
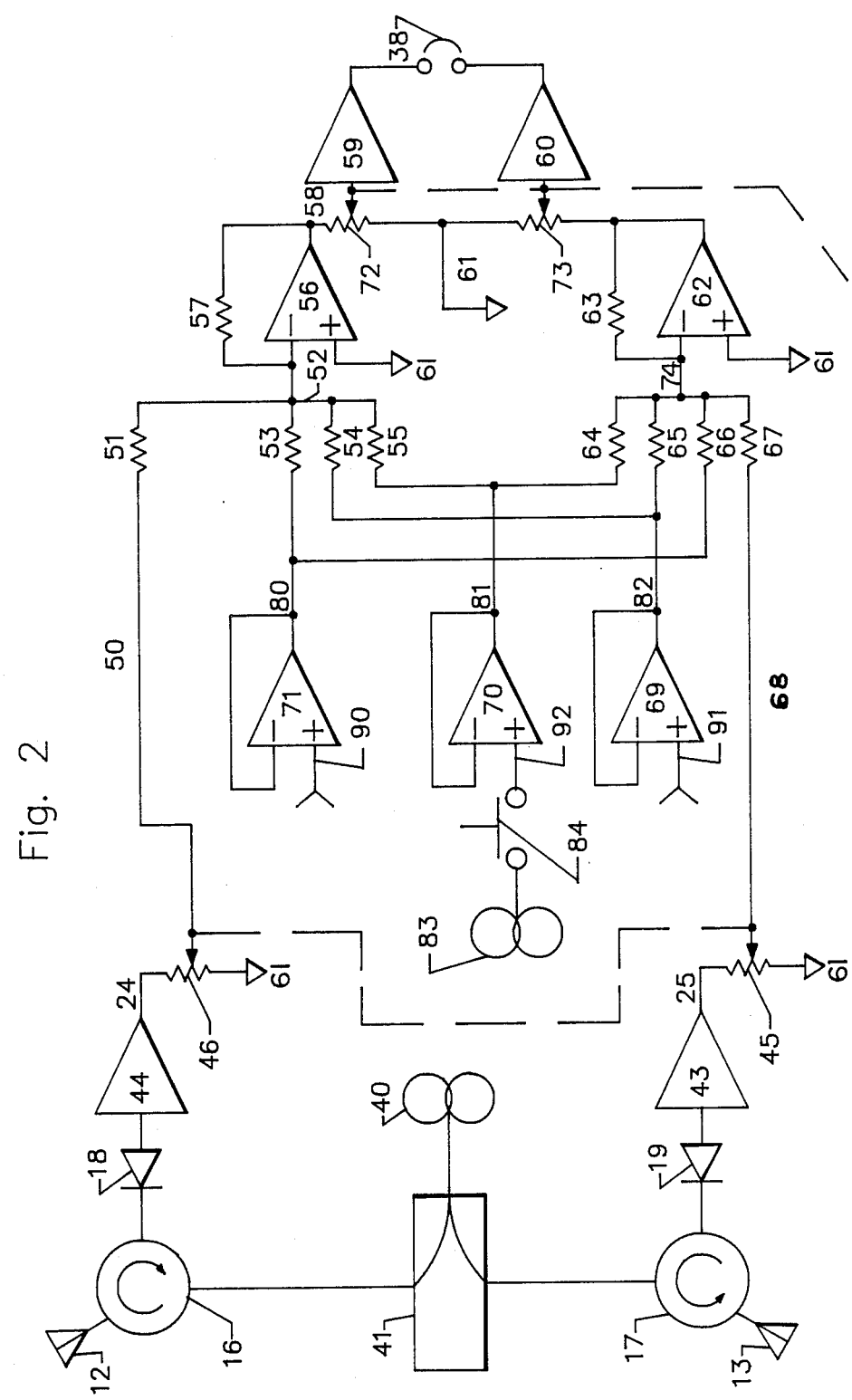
FIG. 2 is a schematic diagram of the electronic circuit of the audio amplifier and mixing system employed in the embodiment of the invention illustrated in FIG. 1.

In the circuit diagram shown in FIG. 2 the reference characters which represent circuit elements described previously are retained. The microwave source identified at 40 in FIG. 2 is essentially identical with sources 14,15 identified in FIG. 1.

In the implementation shown in the circuit of FIG. 2, a single microwave source 40 is indicated connected to a power divider 41, so as to feed both the left and right quadrant duplexers and mixers of the respective doppler radars 10,11 from the one microwave source. The audio outputs from mixer diodes 18 and 19 on lines 21 and 22 are fed to respective amplifiers 3, 44 each with an output gain control 45 and 46. Ground returns are shown at 60 throughout the circuit of FIG. 2. The lines 24 and 25 correspond to lines 24 and 25 shown in FIG. 1.

Referring now to the audio output on line 50 which is taken from the variable arm of an audio level control 46 the audio signal is applied through a summing resistor 51 to a summing point 52 at the input to a summing amplifier 56. On audio output line 68 which is taken from the variable arm of audio level control 45 the audio signal is applied through a summing resistor 67 to summing point 74 at the input to summing amplifier 62. At the input 90 to an amplifier 71 there is applied an audio signal from the user aircraft audio and communications panel, which may incorporate ground control or landing signals or other audio signals used by the pilot in the operation of his aircraft.

The output of amplifier 71 on line 80 is applied through a summing resistor 53 to summing point 52 at the input to amplifier 56 and also from line 80 through a summing resistor 66 to amplifier 62. Essentially this applies the output of the aircraft audio and communications systems in parallel to amplifiers 56 and 62. A second audio input amplifier 69 is available in the same manner as amplifier 71 for other signals the pilot may need to use in flight. The signal from amplifier 69 is summed in parallel to amplifiers 56 and 62 from output line 82 through summing resistors 55 and 65.

A third amplifier 70 is provided to receive a test signal from an audio signal source at 83 through a normally open momentary push button switch 84 which can be applied selectively by the pilot to test or adjust the balance of the system. The output of amplifier 70 on line 81 is applied in parallel via summing or isolation resistors 55 and 64 to amplifiers 56 and 62. The audio test signal may thus be applied at will to the earphones 38 via amplifiers 56 and 59 to one phone and via amplifiers 62 and 60 to the other phone. Controls 72 and 73 at the respective outputs of amplifiers 56 and 62 are adjusted to balance the signal input to power amplifiers 59 and 60 to provide equal input amplitudes to the respective phones of the stereo or binaural headset 38.

It can be seen from the above description of the circuit of FIG. 2 that in the normal collision avoidance application of the system of this invention the respective location, direction, and rate information contained in the audio signals from the respective doppler reflective radars, 10,11 are applied through summing amplifiers to the stereo earphones 28, while, when present, other audio signals in the pilot's cockpit facilities can be mixed with them as also can a test signal as desired.

There has been described herein an aircraft collision avoidance method and means by which a pilot is able to identify aurally the location, direction and rate of closing or motion of a nearby aircraft that poses a threat to the aircraft using this method and system. Through the use of a pair of doppler reflective radar transceivers, reflections from nearby aircraft produce binaural audio signals applied to a pair of binaural or stereo headphones to provide the pilot with an indication of the location of the craft threatening collision. The system electronic circuits are so arranged that other audio signal systems required by the pilot in the operation of the aircraft may be heard without disturbing the operation of or interference with the collision avoidance system.

What is claimed as new is:

1. A system for alerting the pilot of an aircraft, using said system, to the presence and location of another aircraft nearby, which constitutes a potential threat of collision with the user's aircraft, said system consisting of:
   a pair of continuous wave microwave doppler reflective radar transceivers disposed in the pilot's aircraft, each of said transceivers, respectively, including at least a horn microwave antenna for generating a directional microwave beam and receiving reflected signals from target objects in said beam, a source of microwave signals connected in common to both of said pair of continuous wave microwave doppler reflective radar transceivers, a duplexer, a mixer and an audio output means;
   the respective microwave beams from said continuous wave microwave antennas of said transceivers being directed orthogonally with respect to one another, at an angle of 45 degrees on either side of the longitudinal axis of the user aircraft, the overall beam width of the two beams covering a 180 degree area ahead of said user aircraft;
   each of said doppler radar transceivers being adapted to produce an audio signal when a threat object appears in said beams, said audio signals being applied to a binaural audio headset worn by the pilot;
   said binaural audio headset being also connected with the communication system of the user aircraft, so that the pilot thereof may be in communication with the ground, or other aircraft as well as hear the binaural signals produced from the collision alert system audio;
   the presence of said binaural audio signals being an indication of the presence of a target object, such as another aircraft, in the directional beams of said antennas, and the frequency of said binaural audio signals being an indication of the closing or separation rate between said target object and said user aircraft, the amplitude of said binaural signals being an indication of the range to the target object, and the phase difference between the respective audio signals heard in said binaural headset from each of said pair of doppler radar transceivers being indicative of the direction and location of said target object;
   whereby the pilot of the user aircraft is alerted by the binaural audio signals heard in his headset and is able, aurally to locate the target aircraft with respect to the user aircraft, its rate of motion towards the user aircraft and the direction of motion, so as to take appropriate evasive action to avoid a collision.

2. In the aircraft pilot collision alerting system defined in claim 1:
   a second pair of doppler radar transceivers identical with said pair defined in claim 1, having the directional antennas thereof directed to the rear of the user aircraft so as to produce a second pair of audio signals in the presence of a threat aircraft within the doppler radar beams of said second pair of transceivers;
   the resulting four sets of doppler-radar-generated audio signals being connected with a quadriphonic audio system such that directional, range, and closing or escape rate audio signals will be heard by the pilot of the user aircraft in a pair of quadriphonic earphones to alert him or her to the presence of aircraft presenting potential threats of collision in all four quadrants of the airspace in the flight plane of the user aircraft, so that the pilot may take appropriate evasive action.

3. An aircraft collison alert system consisting of:
   a first continuous wave microwave doppler radar transceiver disposed in a user aircraft, said first transceiver having a first directional antenna, the transmitting and receiving beam of said first antenna being directed ahead of the user aircraft at an angle of 45 degrees to the left of the aircraft's longitudinal axis, said first doppler radar transceiver producing a first audio signal when a target object, such as another aircraft, appears in said beam of said first antenna, presenting a potential threat of collision with said user aircraft;
   a second continuous wave microwave doppler radar transceiver, disposed in said user aircraft, having a second directional antenna, the transmitting and receiving beam of said second antenna being directed ahead of said user aircraft at an angle of 45 degrees to the right of the aircraft's longitudinal axis, said second doppler radar transceiver producing a second audio signal when said collision threatening target object appears also in said beam of said second antenna;

a source of microwave signals;

said first and said second continuous wave microwave transceivers being connected to and using said source of microwave signals in common;

the beam widths of each of said first and second directional beams being such that threat objects appearing within a 180 degree forward area about said longitudinal axis of said user aircraft will come within the beams of both of said doppler radars to produce reflections resulting in said first and second audio signals, as a binaural signal pair;

said binaural audio signals being applied to the respective headphones of a binaural audio headset where they are heard by the pilot of the user aircraft wearing said headset and where phase differences between the two binaural audio signals give directional information aurally to the pilot as to the location of the threat aircraft with respect to the user aircraft, the specific frequency of said binaural audio signals giving the pilot of the user aircraft the closing rate between said user and said nearby aircraft, and the amplitude of said binaural audio signals giving range to said nearby aircraft, thereby alerting the pilot to the presence and location of the threat object and providing him with appropriate information to avoid the potential collision.

4. In the aircraft collision alert system defined in claim 3:

third and fourth continuous-wave microwave doppler radar transceivers, each identical to said first and second continuous-wave microwave doppler radar transceivers;

the respective directional antennas of said third and fourth continuous-wave microwave doppler radars being directed to the rear of the aircraft at an angle of 45°, one to the right and the other to the left of the longitudinal axis of the user aircraft, so as to provide a four quadrant coverage with said first and second radars producing four audio signals indicative of the presence of potential threat aircraft in the vicinity of said user aircraft;

said four audio signals being connected with a quadriphonic audio system to provide, aurally, alert information to the pilot of the user aircraft in all four quadrants about the user aircraft concerning the presence of possibly conflicting aircraft in the plane of flight of the user aircraft.

5. The method of alerting the pilot of a user aircraft to the presence of another aircraft in the vicinity of the user aircraft comprising the steps of:

directing continuous wave microwave reflective doppler radar transmitting beams at respective angles of 45 degrees to the left and 45 degrees to the right of the longitudinal axis of the user aircraft;

receiving doppler radar reflection signals from each of said beams when an aircraft or other target objects are within said beams;

deriving respective audio signals from each of said reflection signals;

applying said audio signals binaurally to a pair of stereo headphones worn by the pilot of said user aircraft;

the presence of said binaural audio signals being an indication of the presence of a target object, such as another aircraft, in said directed radar transmitting beams, and the frequency of said binaural signals being an indication of the closing or separation rate between said target object and said user aircraft, the amplitude of said binaural signals being an indication of the range to said target object, and the phase difference between the respective audio signals heard in said stereo headphones from each of said doppler radar reflection signals being indicative of the direction and location of said target object; and also applying audio signals from the communications system of said user aircraft to said earphones through summing means.

6. In the method for alerting the pilot of a user aircraft to the presence of an aircraft nearby as defined in claim 5:

directing a second pair of microwave continuous-wave doppler radar beams at angles of 45° to the left and 45° to the right of the longitudinal axis of the user aircraft directed behind the user aircraft;

deriving a second pair of audio signals from reflections from target objects in said second pair of beams to generate with said binaural signals quadriphonic audio signals by which the pilot of the user aircraft can locate aurally the presence, direction and rate of motion and distance to a target object constituting a threat of collision with the user aircraft in all four quadrants of the airspace in the flight plane of the user aircraft so that the pilot may avoid the collision by taking appropriate evasive action.

* * * * *